(12) United States Patent
Zhuo

(10) Patent No.: US 11,175,987 B2
(45) Date of Patent: *Nov. 16, 2021

(54) SHARED BLOCKCHAIN DATA STORAGE BASED ON ERROR CORRECTION CODE

(71) Applicant: Advanced New Technologies Co., Ltd., George Town (KY)

(72) Inventor: Haizhen Zhuo, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/713,961

(22) Filed: Dec. 13, 2019

(65) Prior Publication Data

US 2021/0034460 A1 Feb. 4, 2021

Related U.S. Application Data

(63) Continuation of application No. PCT/CN2019/098930, filed on Aug. 1, 2019.

(51) Int. Cl.
*H03M 13/00* (2006.01)
*G06F 11/10* (2006.01)
(Continued)

(52) U.S. Cl.
CPC ...... *G06F 11/1076* (2013.01); *G06F 16/2379* (2019.01); *H03M 13/154* (2013.01); *H04L 9/0643* (2013.01)

(58) Field of Classification Search
None
See application file for complete search history.

(56) References Cited

U.S. PATENT DOCUMENTS

2016/0330034 A1 11/2016 Back et al.
2017/0236123 A1 8/2017 Ali et al.
(Continued)

FOREIGN PATENT DOCUMENTS

CA 3050560 4/2019
CN 105630609 6/2016
(Continued)

OTHER PUBLICATIONS

U.S. Appl. No. 16/712,702, Zhou, filed Dec. 12, 2019.
(Continued)

*Primary Examiner* — Mujtaba M Chaudry
(74) *Attorney, Agent, or Firm* — Fish & Richardson P.C.

(57) ABSTRACT

Disclosed herein are methods, systems, and apparatus, including computer programs encoded on computer storage media, for storing blockchain data. One of the methods includes determining, by a blockchain node, one or more blocks that are infrequently visited; performing error correction coding of the one or more blocks to generate one or more encoded blocks; dividing, based on one or more predetermined rules, each of the one or more encoded blocks to a plurality of data sets; selecting one or more data sets from the plurality of data sets of each of the one or more encoded blocks based on the one or more predetermined rules; hashing the one or more data sets to generate one or more hash values corresponding to the one or more data sets; storing the one or more hash values; and deleting the one or more data sets.

30 Claims, 7 Drawing Sheets

(51) Int. Cl.
*H04L 9/06* (2006.01)
*H03M 13/15* (2006.01)
*G06F 16/23* (2019.01)

(56) References Cited

U.S. PATENT DOCUMENTS

| | | | |
|---|---|---|---|
| 2018/0060496 A1* | 3/2018 | Bulleit | G16H 10/60 |
| 2018/0139278 A1 | 5/2018 | Bathen et al. | |
| 2018/0189312 A1 | 7/2018 | Alas et al. | |
| 2018/0191502 A1 | 7/2018 | Karame | |
| 2018/0191714 A1* | 7/2018 | Jentzsch | H04L 9/3247 |
| 2018/0217898 A1 | 8/2018 | Tormasov et al. | |
| 2019/0097807 A1 | 3/2019 | Mahanta | |
| 2019/0109707 A1* | 4/2019 | Ajoy | H04L 9/0637 |
| 2019/0303621 A1* | 10/2019 | Baset | H04L 9/0637 |
| 2019/0303867 A1* | 10/2019 | Nair | G06Q 40/08 |
| 2019/0327082 A1* | 10/2019 | Ow | H04L 9/3226 |
| 2019/0349185 A1* | 11/2019 | Kim | H04L 9/0637 |
| 2020/0012805 A1* | 1/2020 | Winarski | G06F 21/6227 |

FOREIGN PATENT DOCUMENTS

| | | |
|---|---|---|
| CN | 106789920 | 5/2017 |
| CN | 109359223 | 2/2019 |
| CN | 109491968 | 3/2019 |
| CN | 109992993 | 7/2019 |
| CN | 110046894 | 7/2019 |
| WO | WO 2018213916 | 11/2018 |
| WO | WO 2019101234 | 5/2019 |

OTHER PUBLICATIONS

U.S. Appl. No. 16/712,828, Zhou, filed Dec. 12, 2019.
U.S. Appl. No. 16/712,935, Zhou, filed Dec. 12, 2019.
U.S. Appl. No. 16/713,332, Zhou, filed Dec. 13, 2019.
U.S. Appl. No. 16/852,212, Zhou, filed Apr. 17, 2020.
Chawla et al., Velocity: scalability improvements in block propagation through rateless erasure coding, Jul. 2019, IEEE, pp. 447-454.
Zhang et al., Untangling blockchain: A data processing view of blockchain systems, Jul. 2018, IEEE, Trans. on Knowledge & Engineering vol. 30, No. 7, pp. 1366-1385.
PCT International Search Report and Written Opinion in International Appln No. PCT/CN2019/098930, dated Apr. 29, 2020, 15 pages (with partial English translation).
PCT International Search Report and Written Opinion in International Appln No. PCT/CN2019/098913, dated Apr. 24, 2020, 14 pages (with partial English translation).
Dai et al, "A Low Storage Room Requirement Framework fro Distributed Ledger in Blockchain," IEEE Access, Mar. 12, 2018, 6 pages.
Extended Search Report in European Appln. No. 19861233.5, dated Sep. 21, 2020, 8 pages.
Extended Search Report in European Appln No. 19861234.3, dated Sep. 21, 2020, 10 pages.
Perard et al, "Erasure Code-Based Low Storage Blockchain Node," 2018 IEEE International Conference on Internet of Things and IEEE Green Computing and Communications and IEEE Cyber, Physical, and Social Computing and IEEE Smart Data, dated Jul. 30, 2018, 6 pages.
Berryhill et al., Blockchain Unchained: Blockchain Technology and Its Use in the Public Sector, Jun. 19, 2018, OECD Publishing, 51 pages.
Karasawas, "Revoking Records in an Immutable Ledger: A Platform for Issuing and Revoking Official Documents on Public Blockchains", 2018, Crypto Conference on Blockchain Technology, IEEE, 7 pages.

\* cited by examiner

SHARED BLOCKCHAIN DATA STORAGE BASED ON ERROR CORRECTION CODE

CROSS-REFERENCE TO RELATED APPLICATIONS

This application is a continuation of PCT Application No. PCT/CN2019/098930, filed on Aug. 1, 2019, which is hereby incorporated by reference in its entirety.

TECHNICAL FIELD

This specification relates to shared storage of blockchain data based on error correction code.

BACKGROUND

Distributed ledger systems (DLSs), which can also be referred to as consensus networks, and/or blockchain networks, enable participating entities to securely and immutably store data. DLSs are commonly referred to as blockchain networks without referencing any particular user case. Examples of types of blockchain networks can include public blockchain networks, private blockchain networks, and consortium blockchain networks. A consortium blockchain network is provided for a select group of entities, which control the consensus process, and includes an access control layer.

Blockchain-based programs can be executed by a distributed computing platform such as an Ethereum. For example, the Ethereum virtual machine (EVM) provides the runtime environment for smart contracts in Ethereum. An Ethereum blockchain can be viewed as a transaction-based state machine. State data in an Ethereum can be assembled to a global shared-state referred to as a world state. The world state comprises a mapping between Ethereum account addresses and account states. The world state can be stored in data structures such as the Merkle Patricia tree (MPT).

Besides state data, blockchain networks can also store other types of data such as block data and index data. Block data can include block header and block body. The block header can include identity information of a particular block and the block body can include transactions that are confirmed with the block. When more and more transactions are entered into the blockchain, state data and block data can grow very large in size. In some DLSs, every node stores an entire copy of the blockchain, which can take large amount of storage space, even if some of the old block data or state data are not frequently visited. In some DLSs, a few shared nodes store the entire copy of the blockchain and share blockchain data with other blockchain nodes which can create "data inequality."

Accordingly, it would be desirable to reduce the amount of data stored on the nodes in the DLS while maintaining data equality and data processing efficiency.

SUMMARY

This specification describes technologies for storing blockchain data based on error correction code. These technologies generally involve determining, by a blockchain node, one or more blocks that are infrequently visited, wherein the one or more blocks are stored on the blockchain node and created on a blockchain; performing, by the blockchain node, error correction coding of the one or more blocks to generate one or more encoded blocks; dividing, by the blockchain node based on one or more predetermined rules, each of the one or more encoded blocks to a plurality of data sets; selecting, by the blockchain node, one or more data sets from the plurality of data sets of each of the one or more encoded blocks based on the one or more predetermined rules; hashing, by the blockchain node, the one or more data sets to generate one or more hash values corresponding to the one or more data sets; storing, by the blockchain node, the one or more hash values; and deleting, by the blockchain node, the one or more data sets.

This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
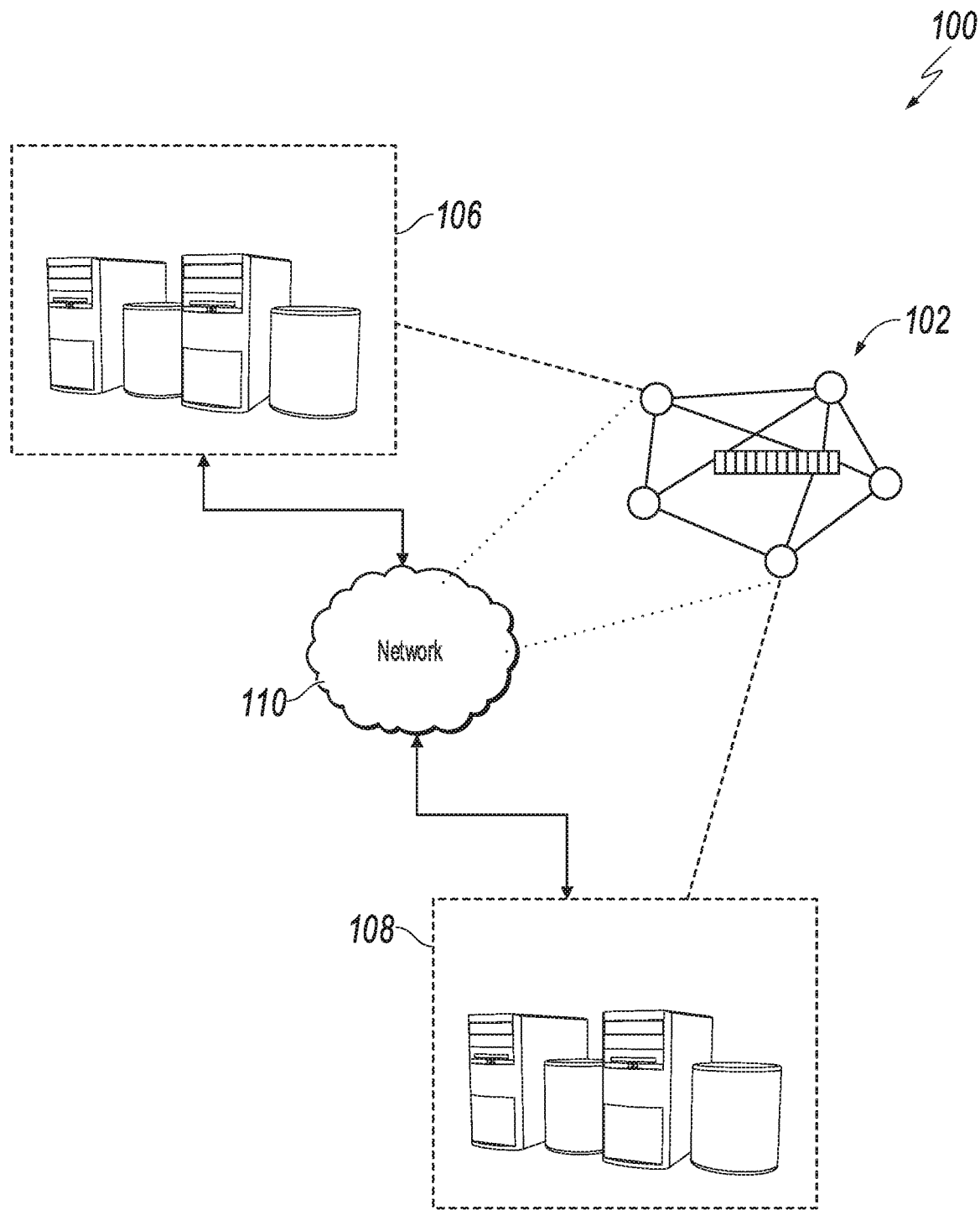
FIG. 1 depicts an example of an environment that can be used to execute embodiments of this specification.

This specification describes technologies for storing blockchain data based on error correction code (ECC). These technologies generally involve determining, by a blockchain node, one or more blocks that are infrequently visited, wherein the one or more blocks are stored on the blockchain node and created on a blockchain; performing, by the blockchain node, ECC of the one or more blocks to generate one or more encoded blocks; dividing, by the blockchain node based on one or more predetermined rules, each of the one or more encoded blocks to a plurality of data sets; selecting, by the blockchain node, one or more data sets from the plurality of data sets of each of the one or more encoded blocks based on the one or more predetermined rules; hashing, by the blockchain node, the one or more data sets to generate one or more hash values corresponding to the one or more data sets; storing, by the blockchain node, the one or more hash values; and deleting, by the blockchain node, the one or more data sets.

The techniques described in this specification produce several technical effects. For example, embodiments of the subject matter can allow savings of storage resources of blockchain nodes without significantly sacrificing computational efficiency. Because some of the older blocks are infrequently used, by saving only a portion of ECC encoded block data and sharing the rest of the encoded data with other blockchain nodes, storage space consumption across the blockchain network can be reduced.

In some embodiments, instead of storing the entire block, a blockchain node can store a selected portion of the ECC encoded block and hash values corresponding to the rest of the encoded block. To retrieve unsaved block data from other blockchain nodes, the blockchain node can send corresponding hash values to the other blockchain nodes that store the encoded block that includes the block data. Since hash values are irreversible, the blockchain node can easily verify whether the received data are authentic, by comparing the corresponding hash values to the locally stored copies. As such, data security can be ensured and faulty nodes can be easily identified and reported. Even if the blockchain node receives unauthentic data from faulty blockchain nodes, the block can be recovered as long as the percentage of the unauthentic data is less than or equal to the maximum fraction of erroneous bits or of missing bits allowed by the ECC.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. It is contemplated, however, that embodiments of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

FIG. 1 is a diagram illustrating an example of an environment 100 that can be used to execute embodiments of this specification. In some examples, the environment 100 enables entities to participate in a consortium blockchain network 102. The environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general, the network 110 represents one or more communication networks. In some cases, the computing devices 106, 108 can be nodes of a cloud computing system (not shown), or each computing device 106, 108 can be a separate cloud computing system including a number of computers interconnected by a network and functioning as a distributed processing system.

In the depicted example, the computing systems 106, 108 can each include any appropriate computing system that enables participation as a node in the consortium blockchain network 102. Examples of computing devices include, without limitation, a server, a desktop computer, a laptop computer, a tablet computing device, and a smartphone. In some examples, the computing systems 106, 108 host one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
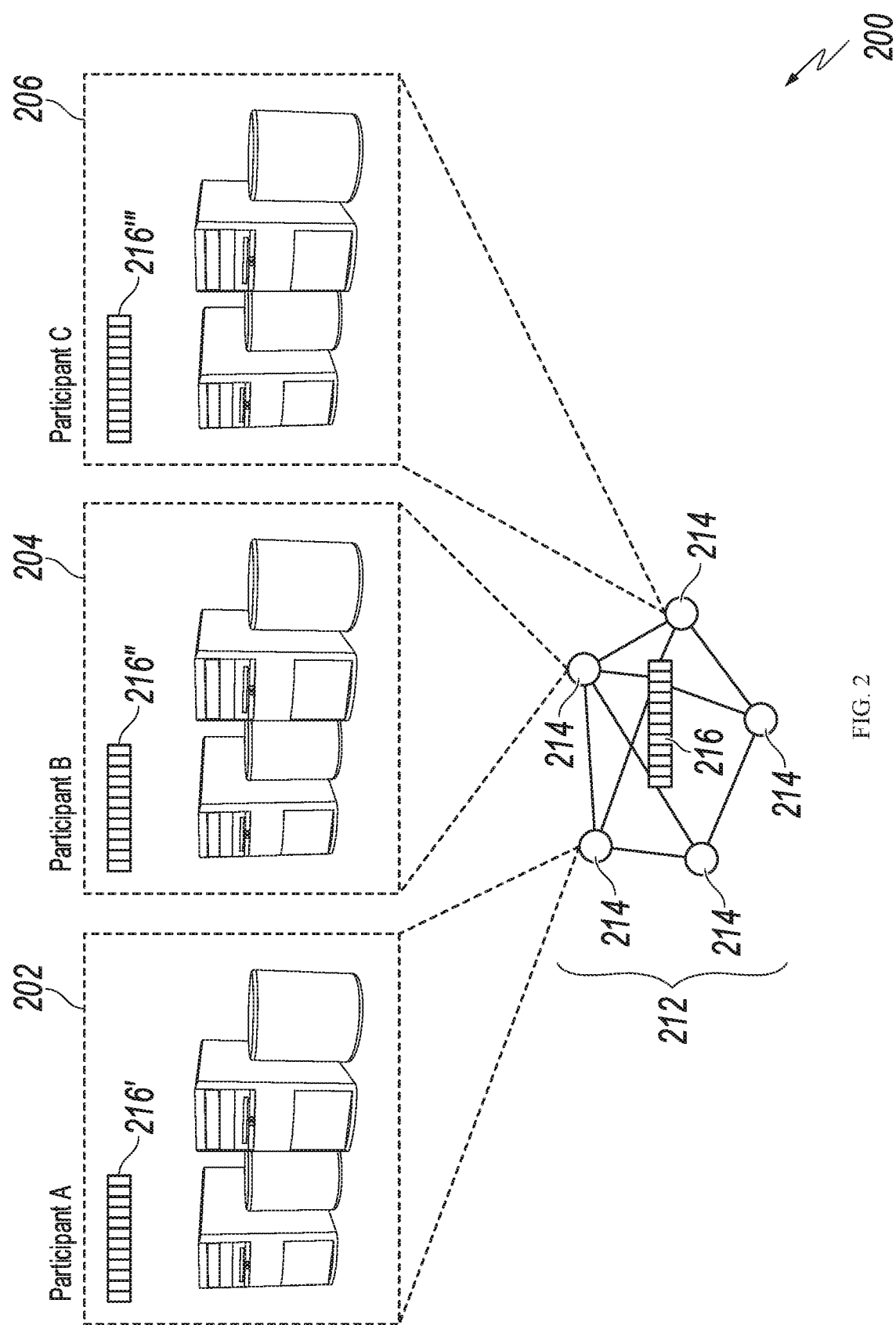
FIG. 2 depicts an example of an architecture in accordance with embodiments of this specification.

FIG. 2 depicts an example of an architecture 200 in accordance with embodiments of this specification. The example conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including a plurality of nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as miner nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204, and 206 store respective, complete copies 216', 216", and 216''' of the blockchain 216.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of a transaction can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed.

Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed. Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

As described earlier, blockchain networks can store different types of data such as state data, block data, and index data. Block data includes all the transactions in the blockchain network, which can take a large amount of storage space. For infrequently used blocks, such as blocks that have been created for a long time, it would be desirable that each blockchain node in the blockchain network stores only a portion of the block data and retrieves the rest of the block data from other nodes to reduce storage consumption. However, if faulty nodes or unreliable nodes exist in the blockchain network, the received data may not be trusted or data loss may occur.

In some embodiments, ECC such as erasure code can be used to encode the block data. By sharing ECC encoded block data instead of original block data, even if unauthentic data exists or data loss occurs, the original block data can be recovered, as long as the unauthentic data or data loss is less than or equal to the maximum fraction of erroneous bits or of missing bits that can be corrected by the ECC.

Figure 3:
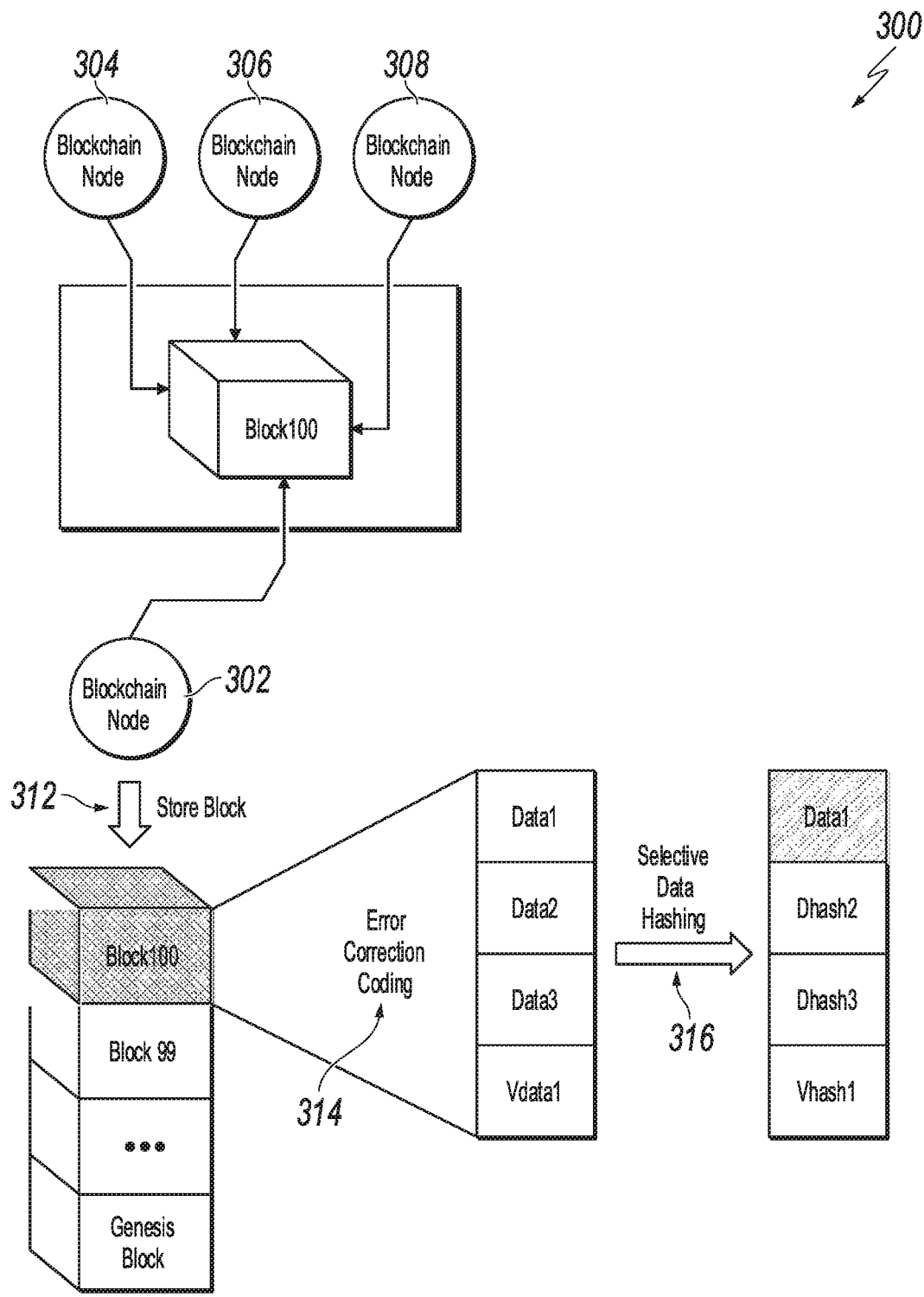
FIG. 3 depicts an example of a block data encoding and hashing process in accordance with embodiments of this specification.

FIG. 3 depicts an example of a block data encoding and hashing process 300 in accordance with embodiments of this specification. In this example, a blockchain network of four blockchain nodes is depicted, which are blockchain nodes 302, 304, 306, and 308. Using blockchain node 302 as an example to illustrate the encoding and hashing process 300, the blockchain node 302 can store block data of the blockchain network to block body of a block 312. In the illustrated example, after block data are stored in a block (i.e., block 100), the blockchain node 302 can engage in a consensus process with other blockchain nodes 302, 304, 306, and 308. During the consensus process, the blockchain node 302 can perform a consensus algorithm, such as proof of work (PoW) or proof of stake (PoS) to create a corresponding block on the blockchain.

In some embodiments, the blockchain node 302 can identify one or more infrequently visited blocks. In practice, the longer a block has been created, the less likely the block data included in the block are needed for executing smart contracts. Therefore, the blockchain node 302 can determine that locally stored blocks are infrequently visited blocks when they have been created on the blockchain for a predetermined amount of time. For example, the predetermined amount of time can be one or two times of the average time a block is created. In some cases, a block can also be determined as infrequently visited when no block data in the block is retrieved for the predetermined amount of time to execute smart contracts.

After identifying infrequently visited blocks, the blockchain node 302 can perform error-correction coding (ECC) 314 of block data in the block body of each of the infrequently visited blocks. ECC can be used for controlling errors or losses of data over unreliable transmissions by adding redundant bits to the data. The redundancy can allow errors or losses of data to be corrected without retransmission of the data. One example ECC can be the erasure coding. Using the erasure coding, a message of k symbols can be encoded to a codeword with n symbols, where k and n are natural numbers, and k<n. The message can be recovered from a subset of the n-symbol codeword. The fraction r=k/n is the code rate of the erasure code.

By using ECC, each of the blockchain nodes can store a portion of the encoded block data and retrieve the rest of the encoded block data from other blockchain nodes when needed. In some embodiments, the ECC can be performed when utilization rate of computational resource of the blockchain node 302 is lower than a predetermined value (e.g., 40%). As such, the interference with other computational operations on the blockchain node 302 can be reduced. In some embodiments, ECC can be performed when the usage of storage space of the blockchain node 302 is greater than or equal to a predetermined percentage, such that after ECC, some portions of the encoded block data can be deleted to free up storage space.

Using again block 100 as an example, assuming that the blockchain node 302 determines the block 100 as an infrequently visited block and performs ECC 314, the ECC encoded data can be divided into a plurality of data sets based on one or more predetermined rules. In the illustrated example shown in FIG. 3, the encoded block data of block 100 is divided into four data sets, which are Data1, Data2, Data3, and VData1, each to be kept by one of the blockchain nodes 302, 304, 306, and 308. VData1 can represent the redundant bits of the ECC for error correction. Data1 is selected to be stored by the blockchain node 302 according to the one or more predetermined rules. Data2, Data3, and Vdata1 are selected to be separately hashed 316 to generate hash values Dhash2, Dhash3, and Vhash1, respectively.

Figure 4:
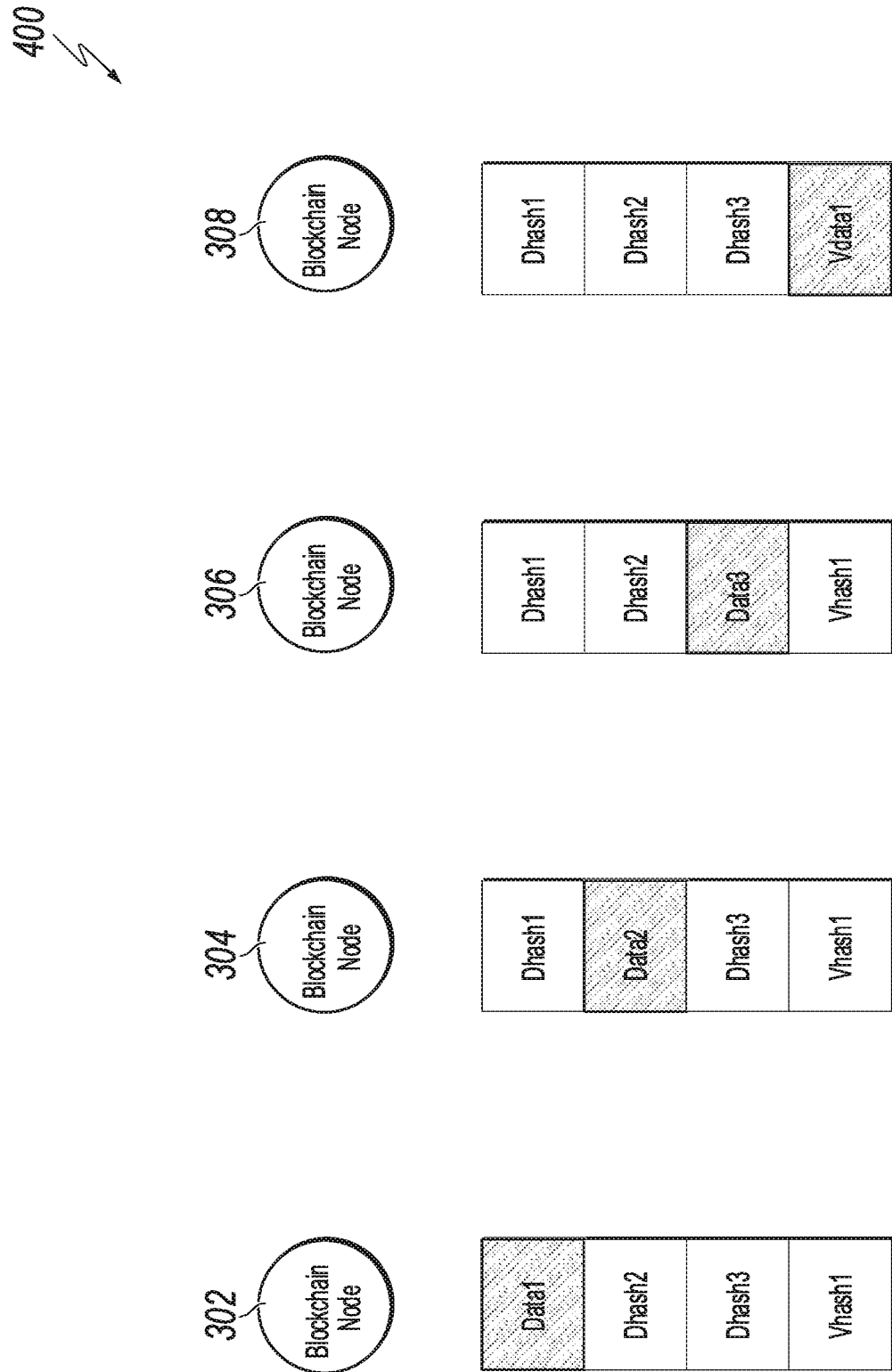
FIG. 4 depicts an example of a data storage arrangement in accordance with embodiments of this specification.

Referring now to FIG. 4, FIG. 4 depicts an example of a data storage arrangement 400 in accordance with embodiments of this specification. As discussed earlier, Data1 is selected to be stored by the blockchain node 302 according to the one or more predetermined rules. Based on the data storage arrangement 400, blockchain node 304 stores Data2 and separately hashes Data1, Data3, and Vdata1 to generate hash values Dhash1, Dhash3, and Vhash1, respectively. Blockchain node 306 stores Data3 and separately hashes Data1, Data2, and Vdata1 to generate hash values Dhash1, Dhash2 and Vhash1, respectively. Blockchain node 308 stores Vdata1 and separately hashes Data1, Data2, and Vdata3 to generate hash values Dhash1, Dhash2 and Dhash3, respectively.

Referring back to FIG. 3, since the hash values correspond to encoded data sets of the same block, they can be indexed by a block ID of the block. For example, the blockchain node 302 can index Data1, Dhash1, Dhash2, and Vhash1 associated with block 100 with a block ID 100. As such, the blockchain node 302 can use the indexed block ID to map the hash values to their corresponding blocks.

It is to be understood that other data storage arrangements can be made for the blockchain nodes 302, 304, 306, and 308, according to the one or more predetermined rules. In some examples, the encoded block data of block 100 can be divided to more than four datasets. It is to be understood that other data storage arrangements can be made for the blockchain nodes 502, 504, 506, and 508, according to the one or more predetermined rules. Generally, the one or more predetermined rules can include one or more instructions for dividing the encoded data to a plurality of data sets based on the number of blockchain nodes in a blockchain network. The one or more predetermined rules can also include assignments of one or more data sets of the plurality of data sets to be stored or hashed by each of the blockchain nodes. To ensure data equality, the one or more predetermined rules can include an assignment of at least one data set to be stored by each blockchain node of the blockchain network. In some examples, based on the predetermined rules, the encoded block can be divided to more than four datasets when the blockchain network has more than four nodes. In some examples, each of the blockchain nodes can store more than one data set and hash the rest of the data sets stored by other nodes.

After generating and storing Dhash2, Dhash3, and Vhash1, the blockchain node 302 can delete Data2, Data3, and Vdata1 from storage to save storage space. As such, for each block, the blockchain node 302 only stores one ECC encoded data set (i.e., Data1) and three hash values (i.e., Dhash2, Dhash3, and Vhash1), instead of the entire block. As such, storage space can be significantly reduced. Similar to block 100, the encoding and hashing process can be performed for other infrequently visited blocks that are stored by the blockchain nodes 304, 306, and 308.

When the blockchain node 302 determines that block data of the block 100 is needed for executing a smart contract, it can retrieve Data2, Data3, and Vdata1 from blockchain nodes 304, 306, and 308, respectively, according to the one or more predetermined rules. To retrieve data sets from other blockchain nodes 304, 306, and 308, blockchain node 302 can send hash values corresponding to the data sets to be retrieved according to the one or more predetermined rules.

For example, to retrieve Data2, the blockchain node 302 can send Dhash2 to the blockchain node 304. If the blockchain node 304 has Data2 stored, it can send the Data2 back to the blockchain node 302 in response to receiving the Dhash2. After receiving the Data2 from the blockchain node 304, the blockchain node 302 can hash the received data set and compare the hash value with Dhash2. If the hash value is the same as Dhash2, the blockchain node 302 can determine that the received data set is authentic. Otherwise, the received data set is determined to be unauthentic. The blockchain node 302 can report the blockchain node 304 as a faulty node (or a Byzantine node) when the received data set is determined as unauthentic. If the percentage of unauthentic data received by the blockchain node 302 is less than or equal to the maximum fraction of erroneous bits or of missing bits that can be corrected by the ECC, block 100 can be recovered from the locally stored and received data sets.

Figure 5:
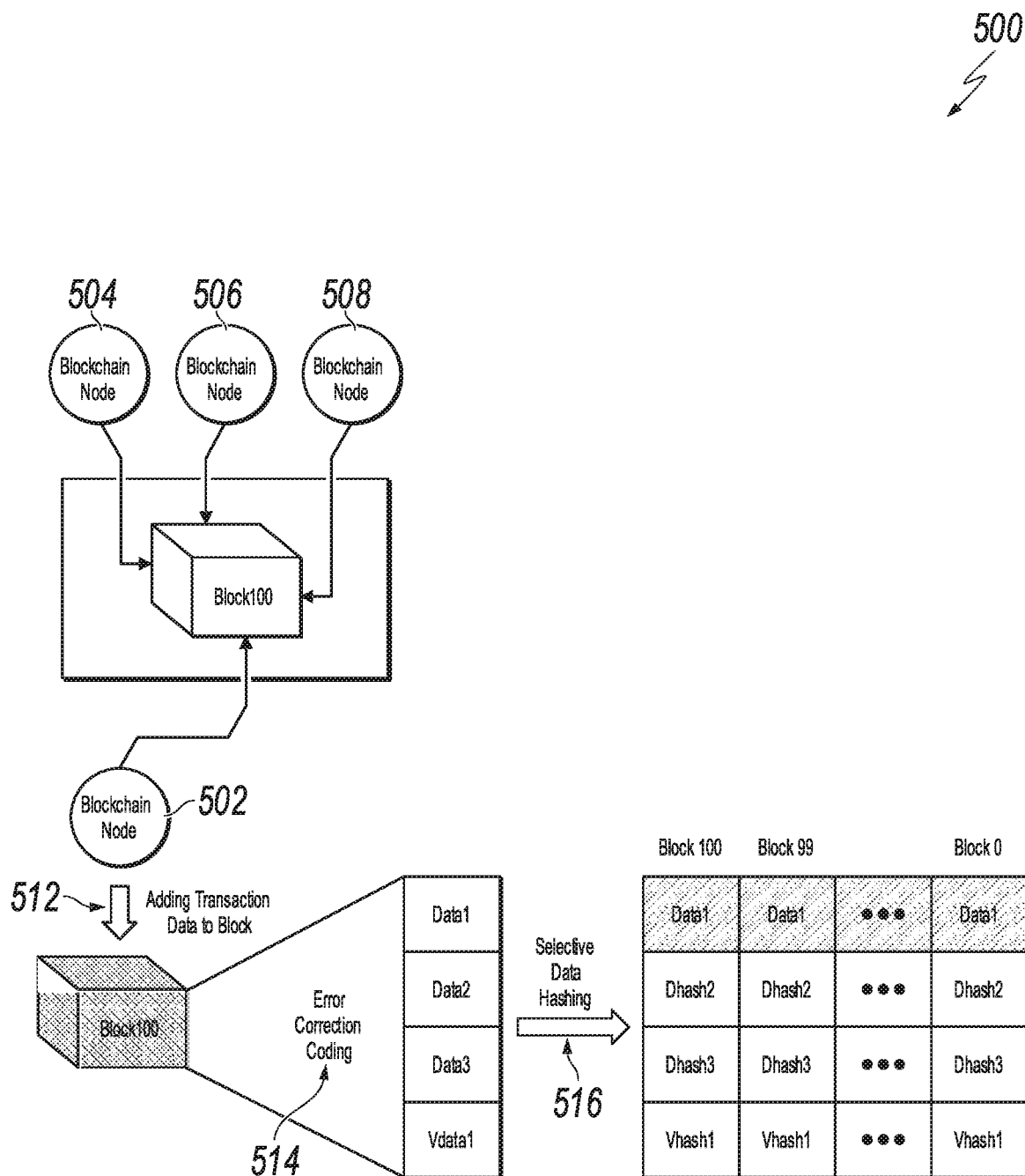
FIG. 5 depicts another example of a block data encoding and hashing process in accordance with embodiments of this specification.

FIG. 5 depicts another example of a block data encoding and hashing process 500 in accordance with embodiments of this specification. In this example, a blockchain network of four blockchain nodes is depicted, which are blockchain nodes 502, 504, 506, and 508. Using blockchain node 502 as an example to illustrate the encoding and hashing process 500, when new block data are added to the block 512, the blockchain node 502 can perform ECC 514 to encode the block data. As compared to the encoding and hashing process 300 discussed in the description of FIG. 3, the blockchain node 502 performs ECC on the block data as they are written to a block. As such, the blockchain node 502 does not need to store the entire block, but can instead, store a selected portion of the ECC encoded block data and hash values corresponding to the rest of the encoded block data based on one or more predetermined rules. This encoding and hashing process 500 can be especially suitable for scenarios when blockchain node 502 has low disk space.

In some embodiments, instead of storing data as blocks, the blockchain node 502 can store a write-ahead log (WAL) file or other similar roll-forward journal files. The WAL file can record block data that have been committed but not yet stored by the blockchain node 502. Using the WAL file, the original blockchain data can be preserved in the database file, while changes of the blockchain data can be written into a separate WAL file. A commit to roll-forward with the changes can happen without ever writing to the original blockchain data. This arrangement allows continued operations of the blockchain data while changes are committed into the WAL file. By using the WAL file to store changes made through the encoding and hashing process 500, the blockchain node 502 can indicate that it has the block data for consensus, while performing the ECC in the background when appropriate. As such, the ECC can be performed when utilization rate of computational resource of the blockchain node 302 is low, in order to reduce the impact on computational efficiency or latency of the consensus process.

In some embodiments, the blockchain node 502 can store the block data in a buffer. The blockchain node 502 can perform ECC to the block data stored in the buffer when the size of the data is greater than a predetermined threshold or when the buffer is full. After performing ECC, the blockchain node 502 can follow the encoding and hashing process 500 to store encoded block data and hash values, as discussed in the description below.

Using again block 100 as an example, after performing the ECC, the encoded block data can be divided into a plurality of data sets based on the one or more predetermined rules. Similar to the example discussed in the description of FIG. 3, the encoded block data of block 100 can be divided into four data sets, which are Data1, Data2, Data3, and VData1, each to be kept by one of the blockchain nodes 502, 504, 506, and 508. VData1 can represent the redundant bits of the ECC. Data1 is selected to be stored by the blockchain node 502 according to the one or more predetermined rules. Data2, Data3, and Vdata1 are selected to be separately hashed 516 to generate hash values Dhash2, Dhash3, and Vhash1, respectively. The hash values can be indexed by a block ID of a corresponding block of the hash values. For example, the blockchain node 502 can index Data1, Dhash1, Dhash2, and Vhash1 associated with block 100 with a block ID 100. As such, the blockchain node 502 can use the indexed block ID to map the hash values to their corresponding blocks.

It is to be understood that other data storage arrangements can be made for the one or more blockchain nodes 502, 504, 506, and 508, according to the one or more predetermined rules. For example, the encoded block data of block 100 can be divided into more than four data sets. Each of the blockchain nodes 502, 504, 506, and 508 can store more than one data set and hash the rest of the data sets stored by other nodes.

After generating Dhash2, Dhash3, and Vhash1, the blockchain node 502 can store Data1, Dhash2, Dhash3, and Vhash1 and delete Data2, Data3, and Vdata1 from storage to save storage space. As such, for each block of the blockchain, the blockchain node 502 only stores one data set (i.e., Data1) and three hash values (i.e., Dhash2, Dhash3, and Vhash1) of the ECC encoded block data instead of the original block data to save on storage space. When the blockchain node 502 determines that block data of the block 100 is needed for executing a smart contract, it can retrieve Data2, Data3, and Vdata1 from blockchain nodes 504, 506, and 508, respectively, according to the one or more predetermined rules.

To retrieve data sets from other blockchain nodes 504, 506, and 508, blockchain node 502 can send hash values corresponding to the data sets to be retrieved according to the one or more predetermined rules. For example, to retrieve Data2, the blockchain node 502 can send Dhash2 to the blockchain node 504. If the blockchain node 504 has Data2 stored, it can send the Data2 back to the blockchain node 502 in response to receiving the Dhash2. After receiving the Data2 from the blockchain node 504, the blockchain node 502 can hash the received data set and compare the hash value with Dhash2. If the hash value is the same as Dhash2, the blockchain node 502 can determine that the received data set is authentic. Otherwise, the received data set can be determined as unauthentic. The blockchain node 502 can report the blockchain node 504 as a faulty node (or a Byzantine node) when the received data set is determined as unauthentic. If the percentage of unauthentic data received by the blockchain node 502 is less than or equal to the maximum fraction of erroneous bits or of missing bits that can be corrected by the ECC, block 100 can be recovered from the locally stored and received data sets.

Figure 6:
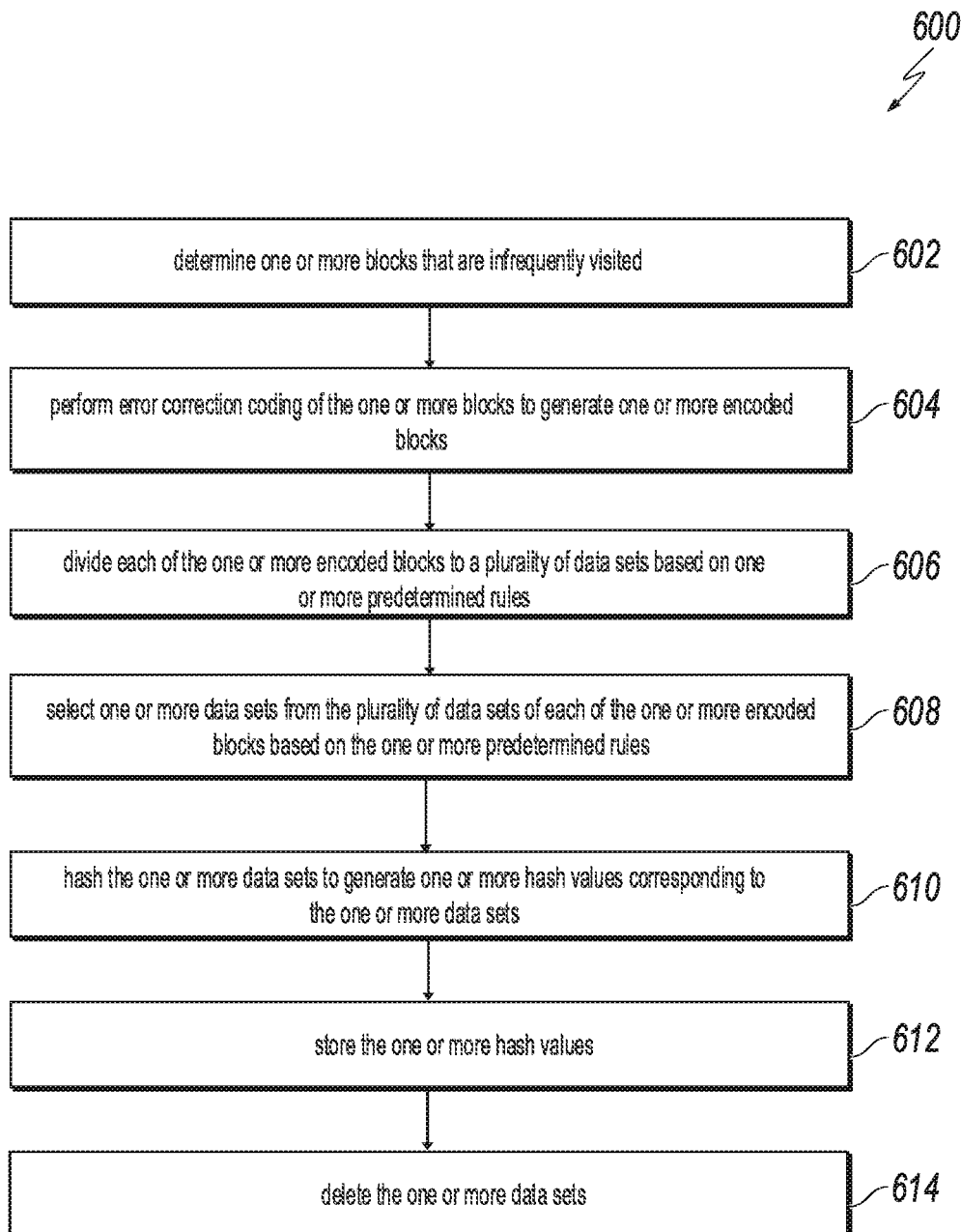
FIG. 6 depicts an example of a process that can be executed in accordance with embodiments of this specification.

FIG. 6 is a flowchart of an example of a process 600 for communicating and sharing blockchain data. For convenience, the process 600 will be described as being performed by a system of one or more computers, located in one or more locations, and programmed appropriately in accordance with this specification. For example, a computing device in a computing system, e.g., the computing system 106, 108 of FIG. 1, appropriately programmed, can perform the process 600.

At 602, a blockchain node determines one or more blocks that are infrequently visited, wherein the one or more blocks are stored on the blockchain node and created on a blockchain.

At 604, the blockchain node performs error correction coding of the one or more blocks to generate one or more encoded blocks.

At 606, the blockchain node divides each of the one or more encoded blocks to a plurality of data sets based on one or more predetermined rules.

At 608, the blockchain node selects one or more data sets from the plurality of data sets of each of the one or more encoded blocks based on the one or more predetermined rules.

At 610, the blockchain node hashes the one or more data sets to generate one or more hash values corresponding to the one or more data sets.

At 612, the blockchain node stores the one or more hash values.

At 614, the blockchain node deletes the one or more data sets.

In some cases, the one or more blocks are determined as infrequently visited if the one or more blocks are created for a predetermined amount of time or no block data associated with the one or more blocks are retrieved to execute a smart contract for a predetermined amount of time.

In some cases, the error correction coding is performed when utilization rate of computational resource of the blockchain node is less than or equal to a predetermined value or usage of storage space of the blockchain node is greater than or equal to a predetermined percentage.

In some cases, the error correction coding is performed by adding redundant bits to the one or more blocks. In some cases, the error correction coding is erasure coding.

In some cases, the blockchain node is a first blockchain node and the process 600 further comprising: after deleting the one or more data sets, determining that block data needed for executing a smart contract is associated with at least one of the one or more data sets deleted by the first blockchain node; identifying, based on the one or more predetermined rules, a second blockchain node that stores at least one of the one or more data sets and at least one hash value corresponding to the at least one of the one or more data sets; and sending the at least one hash value to the second blockchain node for retrieving the at least one of the one or more data sets.

In some cases, the at least one hash value is first at least one value, the process 600 further comprising: receiving, from the second blockchain node, at least one data set in response to sending the first at least one hash value; and hashing the at least one data set to generate the second at least one hash value.

In some cases, the process 600 further comprising: determining that the at least one data set is authentic if the first at least one hash value is the same as the second at least one hash value.

In some cases, the process 600 further comprising: identifying, based on the one or more predetermined rules, a third blockchain node that stores at least one of the one or more data sets and a third at least one hash value corresponding to the at least one of the one or more data sets; sending the third at least one hash value to the third blockchain node for retrieving the at least one of the one or more data sets; receiving, from the third blockchain node, at least one data set in response to sending the third at least one hash value; hashing the at least one data set to generate a fourth at least one hash value; and determining that the at least one data set is authentic if the third at least one hash value is the same as the fourth at least one hash value.

In some cases, the process 600 further comprising: before deleting the one or more data sets, indexing the one or more hash values with a block ID of a corresponding block of the one or more blocks associated with the one or more hash values.

In some cases, the one or more predetermined rules indicate one or more different data sets of the plurality of data sets to be hashed by each of a plurality of blockchain nodes of a blockchain network.

Figure 7:
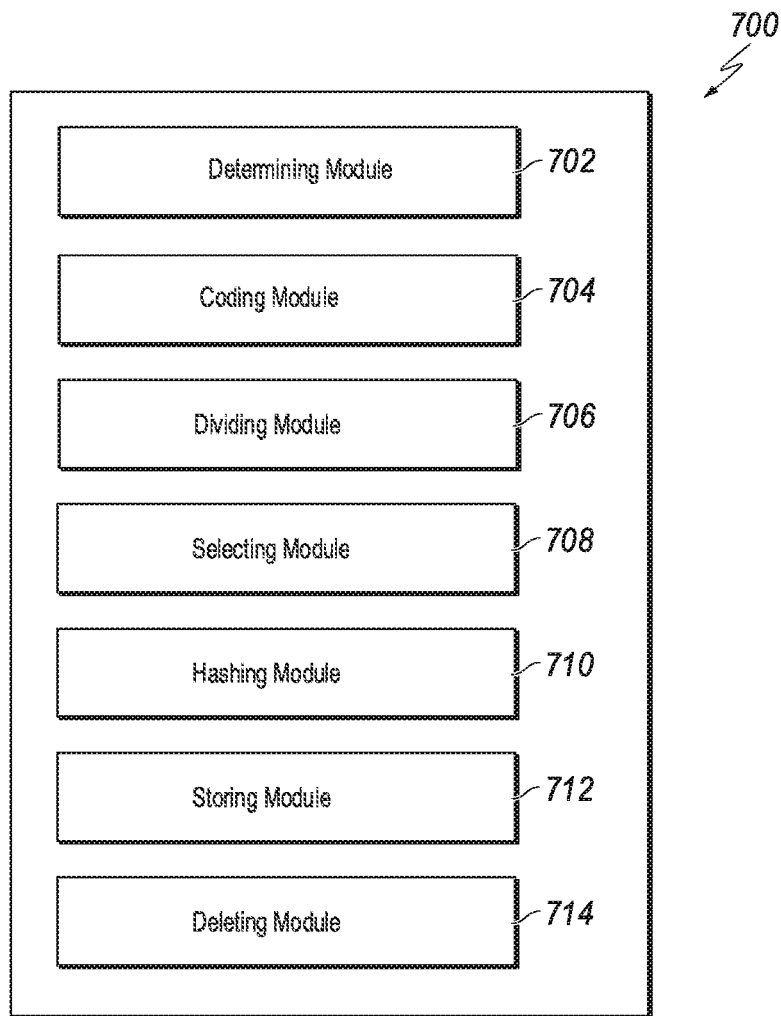
FIG. 7 depicts examples of modules of an apparatus in accordance with embodiments of this specification.

FIG. 7 is a diagram of an example of modules of an apparatus 700 in accordance with embodiments of this specification.

The apparatus 700 can be an example of an embodiment of a blockchain node configured to communicate and share blockchain data. The apparatus 700 can correspond to the embodiments described above, and the apparatus 700 includes the following: a determining module 702 that determines one or more blocks that are infrequently visited, wherein the one or more blocks are stored on the blockchain node and created on a blockchain; a coding module 704 that performs error correction coding of the one or more blocks to generate one or more encoded blocks; a dividing module 706 that divides each of the one or more encoded blocks to a plurality of data sets; a selecting module 708 that selects one or more data sets from the plurality of data sets of each of the one or more encoded blocks based on the one or more predetermined rules; a hashing module 710 that hashes the one or more data sets to generate one or more hash values corresponding to the one or more data sets; a storing module 712 that stores the one or more hash values; and a deleting module 714 that deletes the one or more data sets.

In an optional embodiment, the one or more blocks are determined as infrequently visited if the one or more blocks are created for a predetermined amount of time or no block data associated with the one or more blocks are retrieved to execute a smart contract for a predetermined amount of time.

In an optional embodiment, the error correction coding is performed when utilization rate of computational resource of the blockchain node is less than or equal to a predetermined value or usage of storage space of the blockchain node is greater than or equal to a predetermined percentage.

In an optional embodiment, the error correction coding is performed by adding redundant bits to the one or more blocks. In an optional embodiment, the error correction coding is erasure coding.

In an optional embodiment, the apparatus 700 is a first blockchain node, and the apparatus 700 further comprises: a determination submodule that determines block data needed for executing a smart contract is associated with at least one of the one or more data sets deleted by the first blockchain node; identification submodule that identifies, based on the one or more predetermined rules, a second blockchain node that stores at least one of the one or more data sets and at least one hash value corresponding to the at least one of the one or more data sets; and a sending submodule that sends the at least one hash value to the second blockchain node for retrieving the at least one of the one or more data sets.

In an optional embodiment, the at least one hash value is first at least one value, the apparatus 700 further comprises: a receiver that receives, from the second blockchain node, at least one data set in response to sending the first at least one hash value; and a hashing submodule that hashes the at least one data set to generate the second at least one hash value.

In an optional embodiment, the apparatus 700 further comprises: a determination submodule that determines the at least one data set is authentic if the first at least one hash value is the same as the second at least one hash value.

In an optional embodiment, the apparatus 700 further comprises: an identification submodule that identifies, based on the one or more predetermined rules, a third blockchain node that stores at least one of the one or more data sets and a third at least one hash value corresponding to the at least one of the one or more data sets; a sending submodule that sends the third at least one hash value to the third blockchain node for retrieving the at least one of the one or more data sets; a receiver that receives, from the third blockchain node, at least one data set in response to sending the third at least one hash value; a hashing submodule that hashes the at least one data set to generate a fourth at least one hash value; and a determination submodule that determines the at least one data set is authentic if the third at least one hash value is the same as the fourth at least one hash value.

In an optional embodiment, the apparatus further comprises: an indexing submodule that indexes the one or more hash values with a block ID of a corresponding block of the one or more blocks associated with the one or more hash values.

In an optional embodiment, the one or more predetermined rules indicate one or more different data sets of the plurality of data sets to be hashed by each of a plurality of blockchain nodes of a blockchain network.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 7, it can be interpreted as illustrating an internal functional module and a structure of a blockchain node. An execution body in essence can be an electronic device, and the electronic device includes the following: one or more processors; and one or more computer-readable memories configured to store an executable instruction of the one or more processors. In some embodiments, the one or more computer-readable memories are coupled to the one or more processors and have programming instructions stored thereon that are executable by the one or more processors to perform algorithms, methods, functions, processes, flows, and procedures as described in this specification.

The techniques described in this specification produce several technical effects. For example, embodiments of the subject matter can allow savings of storage resources of blockchain nodes without significantly sacrificing computational efficiency. Because some of the older blocks are infrequently used, by saving only a portion of ECC encoded block data and sharing the rest of the encoded data with other blockchain nodes, storage space consumption across the blockchain network can be reduced.

In some embodiments, instead of storing the entire block, a blockchain node can store a selected portion of the ECC encoded block and hash values corresponding to the rest of the encoded block. To retrieve unsaved block data from other blockchain nodes, the blockchain node can send corresponding hash values to the other blockchain nodes that store the encoded block that includes the block data. Since hash values are irreversible, the blockchain node can easily verify whether the received data are authentic, by comparing the corresponding hash values to the locally stored copies. As such, data security can be ensured and faulty nodes can be easily identified and reported. Even if the blockchain node receives unauthentic data from faulty blockchain nodes, the block can be recovered as long as the percentage of the unauthentic data is less than or equal to the maximum fraction of erroneous bits or of missing bits allowed by the ECC.

Described embodiments of the subject matter can include one or more features, alone or in combination. For example, in a first embodiment, a computer-implemented method for communicating shared blockchain data, the method comprising: determining, by a blockchain node, one or more blocks that are infrequently visited, wherein the one or more blocks are stored on the blockchain node and created on a blockchain; performing, by the blockchain node, error correction coding of the one or more blocks to generate one or more encoded blocks; dividing, by the blockchain node based on one or more predetermined rules, each of the one or more encoded blocks to a plurality of data sets; selecting, by the blockchain node, one or more data sets from the plurality of data sets of each of the one or more encoded blocks based on the one or more predetermined rules; hashing, by the blockchain node, the one or more data sets to generate one or more hash values corresponding to the one or more data sets; storing, by the blockchain node, the one or more hash values; and deleting, by the blockchain node, the one or more data sets.

The foregoing and other described embodiments can each, optionally, include one or more of the following features:

A first feature, combinable with any of the following features, specifies that the one or more blocks are determined as infrequently visited if the one or more blocks are created for a predetermined amount of time or no block data associated with the one or more blocks are retrieved to execute a smart contract for a predetermined amount of time.

A second feature, combinable with any of the following features, specifies that the error correction coding is performed when utilization rate of computational resource of the blockchain node is less than or equal to a predetermined value or usage of storage space of the blockchain node is greater than or equal to a predetermined percentage.

A third feature, combinable with any of the following features, specifies that the error correction coding is performed by adding redundant bits to the one or more blocks.

A fourth feature, combinable with any of the following features, specifies that the error correction coding is erasure coding.

A fifth feature, combinable with any of the following features, specifies that the blockchain node is a first blockchain node, and the method further comprising: after deleting the one or more data sets, determining that block data needed for executing a smart contract is associated with at least one of the one or more data sets deleted by the first blockchain node; identifying, based on the one or more predetermined rules, a second blockchain node that stores at least one of the one or more data sets and at least one hash value corresponding to the at least one of the one or more data sets; and sending the at least one hash value to the second blockchain node for retrieving the at least one of the one or more data sets.

A sixth feature, combinable with any of the following features, specifies that the at least one hash value is first at least one value, the method further comprising: receiving, from the second blockchain node, at least one data set in response to sending the first at least one hash value; and hashing the at least one data set to generate the second at least one hash value.

A seventh feature, combinable with any of the following features, specifies that the method further comprising: determining that the at least one data set is authentic if the first at least one hash value is the same as the second at least one hash value.

An eighth feature, combinable with any of the following features, specifies that the method further comprising: identifying, based on the one or more predetermined rules, a third blockchain node that stores at least one of the one or more data sets and a third at least one hash value corresponding to the at least one of the one or more data sets; sending the third at least one hash value to the third blockchain node for retrieving the at least one of the one or more data sets; receiving, from the third blockchain node, at least one data set in response to sending the third at least one hash value; hashing the at least one data set to generate a fourth at least one hash value; and determining that the at least one data set is authentic if the third at least one hash value is the same as the fourth at least one hash value.

A ninth feature, combinable with any of the following features, specifies that the method further comprising: before deleting the one or more data sets, indexing the one or more hash values with a block ID of a corresponding block of the one or more blocks associated with the one or more hash values.

A tenth feature, combinable with any of the following features, specifies that the one or more predetermined rules indicate one or more different data sets of the plurality of data sets to be hashed by each of a plurality of blockchain nodes of a blockchain network.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for storing blockchain data, the computer-implemented method comprising:
    determining, by a blockchain node, one or more blocks that are infrequently visited, wherein the one or more blocks are stored on the blockchain node and created on a blockchain;
    performing, by the blockchain node, error correction coding of the one or more blocks to generate one or more encoded blocks;
    dividing, by the blockchain node based on one or more predetermined rules, each of the one or more encoded blocks to a plurality of data sets;
    selecting, by the blockchain node, one or more data sets from the plurality of data sets of each of the one or more encoded blocks based on the one or more predetermined rules;
    hashing, by the blockchain node, the one or more data sets to generate one or more hash values corresponding to the one or more data sets;
    storing, by the blockchain node, the one or more hash values; and
    deleting, by the blockchain node, the one or more data sets.

2. The computer-implemented method of claim 1, wherein the one or more blocks are determined as infrequently visited if the one or more blocks are created for a predetermined amount of time or no block data associated with the one or more blocks are retrieved to execute a smart contract for a predetermined amount of time.

3. The computer-implemented method of claim 1, wherein the error correction coding is performed when utilization rate of computational resource of the blockchain node is less than or equal to a predetermined value or usage of storage space of the blockchain node is greater than or equal to a predetermined percentage.

4. The computer-implemented method of claim 1, wherein the error correction coding is performed by adding redundant bits to the one or more blocks.

5. The computer-implemented method of claim 1, wherein the error correction coding is erasure coding.

6. The computer-implemented method of claim 1, wherein the blockchain node is a first blockchain node, and further comprising:
    after deleting the one or more data sets, determining that block data needed for executing a smart contract is associated with at least one data set of the one or more data sets deleted by the first blockchain node;
    identifying, based on the one or more predetermined rules, a second blockchain node that stores at least one data set of the one or more data sets and at least one hash value corresponding to the at least one data set of the one or more data sets; and
    sending the at least one hash value to the second blockchain node for retrieving the at least one data set of the one or more data sets.

7. The computer-implemented method of claim 6, wherein the at least one hash value is a first at least one hash value, and further comprising:
    receiving, from the second blockchain node, at least one data set in response to sending the first at least one hash value; and
    hashing the at least one data set to generate a second at least one hash value.

8. The computer-implemented method of claim 7, further comprising:
    determining that the at least one data set is authentic if the first at least one hash value is identical to the second at least one hash value.

9. The computer-implemented method of claim 7, further comprising:
    identifying, based on the one or more predetermined rules, a third blockchain node that stores at least one data set of the one or more data sets and a third at least one hash value corresponding to the at least one data set of the one or more data sets;
    sending the third at least one hash value to the third blockchain node for retrieving the at least one data set of the one or more data sets;
    receiving, from the third blockchain node, at least one data set in response to sending the third at least one hash value;
    hashing the at least one data set to generate a fourth at least one hash value; and
    determining that the at least one data set is authentic if the third at least one hash value is identical to the fourth at least one hash value.

10. The computer-implemented method of claim 1, further comprising:
    before the deleting the one or more data sets, indexing the one or more hash values with a block ID of a corresponding block of the one or more blocks associated with the one or more hash values.

11. The computer-implemented method of claim 1, wherein the one or more predetermined rules include one or more instructions for dividing the encoded blocks to the plurality of data sets based on a quantity of blockchain nodes of a blockchain network and assignments of one or more data sets of the plurality of data sets to be stored or hashed by each blockchain node of the quantity of blockchain nodes.

12. A non-transitory, computer-readable medium storing one or more instructions executable by a computer system to perform operations for storing blockchain data, comprising:

determining, by a blockchain node, one or more blocks that are infrequently visited, wherein the one or more blocks are stored on the blockchain node and created on a blockchain;

performing, by the blockchain node, error correction coding of the one or more blocks to generate one or more encoded blocks;

dividing, by the blockchain node based on one or more predetermined rules, each of the one or more encoded blocks to a plurality of data sets;

selecting, by the blockchain node, one or more data sets from the plurality of data sets of each of the one or more encoded blocks based on the one or more predetermined rules;

hashing, by the blockchain node, the one or more data sets to generate one or more hash values corresponding to the one or more data sets;

storing, by the blockchain node, the one or more hash values; and deleting, by the blockchain node, the one or more data sets.

13. The non-transitory, computer-readable medium of claim 12, wherein the one or more blocks are determined as infrequently visited if the one or more blocks are created for a predetermined amount of time or no block data associated with the one or more blocks are retrieved to execute a smart contract for a predetermined amount of time.

14. The non-transitory, computer-readable medium of claim 12, wherein the error correction coding is performed when utilization rate of computational resource of the blockchain node is less than or equal to a predetermined value or usage of storage space of the blockchain node is greater than or equal to a predetermined percentage.

15. The non-transitory, computer-readable medium of claim 12, wherein the error correction coding is performed by adding redundant bits to the one or more blocks.

16. The non-transitory, computer-readable medium of claim 12, wherein the error correction coding is erasure coding.

17. The non-transitory, computer-readable medium of claim 12, wherein the blockchain node is a first blockchain node, and further comprising:

after deleting the one or more data sets, determining that block data needed for executing a smart contract is associated with at least one data set of the one or more data sets deleted by the first blockchain node;

identifying, based on the one or more predetermined rules, a second blockchain node that stores at least one data set of the one or more data sets and at least one hash value corresponding to the at least one data set of the one or more data sets; and sending the at least one hash value to the second blockchain node for retrieving the at least one data set of the one or more data sets.

18. The non-transitory, computer-readable medium of claim 17, wherein the at least one hash value is a first at least one hash value, and further comprising:

receiving, from the second blockchain node, at least one data set in response to sending the first at least one hash value; and hashing the at least one data set to generate a second at least one hash value.

19. The non-transitory, computer-readable medium of claim 18, further comprising:

determining that the at least one data set is authentic if the first at least one hash value is identical to the second at least one hash value.

20. The non-transitory, computer-readable medium of claim 19, further comprising:

identifying, based on the one or more predetermined rules, a third blockchain node that stores at least one data set of the one or more data sets and a third at least one hash value corresponding to the at least one data set of the one or more data sets;

sending the third at least one hash value to the third blockchain node for retrieving the at least one data set of the one or more data sets;

receiving, from the third blockchain node, at least one data set in response to sending the third at least one hash value;

hashing the at least one data set to generate a fourth at least one hash value; and determining that the at least one data set is authentic if the third at least one hash value is identical to the fourth at least one hash value.

21. The non-transitory, computer-readable medium of claim 12, further comprising:

before the deleting the one or more data sets, indexing the one or more hash values with a block ID of a corresponding block of the one or more blocks associated with the one or more hash values.

22. The non-transitory, computer-readable medium of claim 12, wherein the one or more predetermined rules include one or more instructions for dividing the encoded blocks to the plurality of data sets based on a quantity of blockchain nodes of a blockchain network and assignments of one or more data sets of the plurality of data sets to be stored or hashed by each blockchain node of the quantity of blockchain nodes.

23. A computer-implemented system for storing blockchain data, comprising:

one or more processors; and one or more computer-readable memories coupled to the one or more processors and having instructions stored thereon that are executable by the one or more processors to perform one or more operations for:

determining, by a blockchain node, one or more blocks that are infrequently visited, wherein the one or more blocks are stored on the blockchain node and created on a blockchain;

performing, by the blockchain node, error correction coding of the one or more blocks to generate one or more encoded blocks;

dividing, by the blockchain node based on one or more predetermined rules, each of the one or more encoded blocks to a plurality of data sets;

selecting, by the blockchain node, one or more data sets from the plurality of data sets of each of the one or more encoded blocks based on the one or more predetermined rules;

hashing, by the blockchain node, the one or more data sets to generate one or more hash values corresponding to the one or more data sets;

storing, by the blockchain node, the one or more hash values; and deleting, by the blockchain node, the one or more data sets.

24. The computer-implemented system of claim 23, wherein the one or more blocks are determined as infrequently visited if the one or more blocks are created for a predetermined amount of time or no block data associated with the one or more blocks are retrieved to execute a smart contract for a predetermined amount of time.

25. The computer-implemented system of claim 23, wherein the error correction coding is performed when utilization rate of computational resource of the blockchain node is less than or equal to a predetermined value or usage of storage space of the blockchain node is greater than or equal to a predetermined percentage.

26. The computer-implemented system of claim 23, wherein the error correction coding is performed by adding redundant bits to the one or more blocks.

27. The computer-implemented system of claim 23, wherein the error correction coding is erasure coding.

28. The computer-implemented system of claim 23, wherein the blockchain node is a first blockchain node, and further comprising:
   after deleting the one or more data sets, determining that block data needed for executing a smart contract is associated with at least one data set of the one or more data sets deleted by the first blockchain node;
   identifying, based on the one or more predetermined rules, a second blockchain node that stores at least one data set of the one or more data sets and at least one hash value corresponding to the at least one data set of the one or more data sets; and
   sending the at least one hash value to the second blockchain node for retrieving the at least one data set of the one or more data sets.

29. The computer-implemented system of claim 28, wherein the at least one hash value is a first at least one hash value, and further comprising:
   receiving, from the second blockchain node, at least one data set in response to sending the first at least one hash value; and
   hashing the at least one data set to generate a second at least one hash value.

30. The computer-implemented system of claim 29, further comprising:
   determining that the at least one data set is authentic if the first at least one hash value is identical to the second at least one hash value.

* * * * *